US012693853B2

(12) United States Patent
Meng et al.

(10) Patent No.: US 12,693,853 B2
(45) Date of Patent: Jul. 28, 2026

(54) METHOD, ELECTRONIC DEVICE, AND COMPUTER PROGRAM PRODUCT FOR SETTING FEATURE FLAGS

(71) Applicant: Dell Products L.P., Round Rock, TX (US)

(72) Inventors: Shufang Meng, Shanghai (CN); Dazhi Dong, Shanghai (CN); Tianping Liu, Shanghai (CN); Guoqiang Ma, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 388 days.

(21) Appl. No.: 18/382,156

(22) Filed: Oct. 20, 2023

(65) Prior Publication Data

US 2024/0338210 A1      Oct. 10, 2024

(30) Foreign Application Priority Data

Apr. 10, 2023    (CN) .......................... 202310377418.3

(51) Int. Cl.
*G06F 8/71* (2018.01)
*G06F 16/11* (2019.01)
*G06F 16/14* (2019.01)

(52) U.S. Cl.
CPC .............. *G06F 8/71* (2013.01); *G06F 16/116* (2019.01); *G06F 16/144* (2019.01); *G06F 16/148* (2019.01)

(58) Field of Classification Search
CPC ........ G06F 8/71; G06F 16/144; G06F 16/148; G06F 16/116
See application file for complete search history.

(56) References Cited

U.S. PATENT DOCUMENTS

| | | | | |
|---|---|---|---|---|
| 7,127,700 | B2 * | 10/2006 | Large | G06F 16/958 |
| | | | | 707/E17.116 |
| 7,447,624 | B2 * | 11/2008 | Fuhrmann | G06F 40/40 |
| | | | | 717/136 |
| 9,767,000 | B1 | 9/2017 | Chida et al. | |
| 9,891,896 | B2 * | 2/2018 | Balasubramanian | G06F 8/71 |
| 9,965,259 | B2 * | 5/2018 | Vargas | G06F 8/51 |
| 10,990,495 | B1 * | 4/2021 | Cieslak | G06F 11/3055 |
| 2006/0101429 | A1 * | 5/2006 | Osborne | G06F 8/51 |
| | | | | 717/137 |
| 2012/0192150 | A1 | 7/2012 | Li et al. | |
| 2015/0169435 | A1 | 6/2015 | Wu | |
| 2017/0168919 | A1 * | 6/2017 | Eberlein | G06F 11/3698 |

(Continued)

*Primary Examiner* — Douglas M Slachta

(74) *Attorney, Agent, or Firm* — BainwoodHuang

(57) ABSTRACT

Techniques for setting feature flags involve generating a target feature flag file with a predetermined data format, the target feature flag file indicating a name and a target state of a target feature. Such techniques further involve generating a feature state query library of the target feature flag by converting the target feature flag file into a plurality of target codes corresponding to a plurality of target programming languages. Such techniques further involve querying, from the feature state query library, a target code corresponding to a target programming language used by a client in the plurality of target programming languages. Such techniques further involve sending the queried target code to the client, the target code indicating the target state of the target feature.

20 Claims, 4 Drawing Sheets

(56)     References Cited

U.S. PATENT DOCUMENTS

| | | | |
|---|---|---|---|
| 2017/0262265 A1* | 9/2017 | Kellicker .................. | G06F 8/51 |
| 2019/0250895 A1* | 8/2019 | Shah ........................ | G06F 8/427 |
| 2019/0310832 A1* | 10/2019 | Myers, III .......... | H04L 12/2807 |
| 2020/0409693 A1* | 12/2020 | Song .......................... | G06F 8/77 |
| 2023/0185546 A1* | 6/2023 | Fink .......................... | G06F 8/22 |
| | | | 717/106 |
| 2024/0311087 A1* | 9/2024 | Bathula ..................... | G06F 8/36 |

* cited by examiner

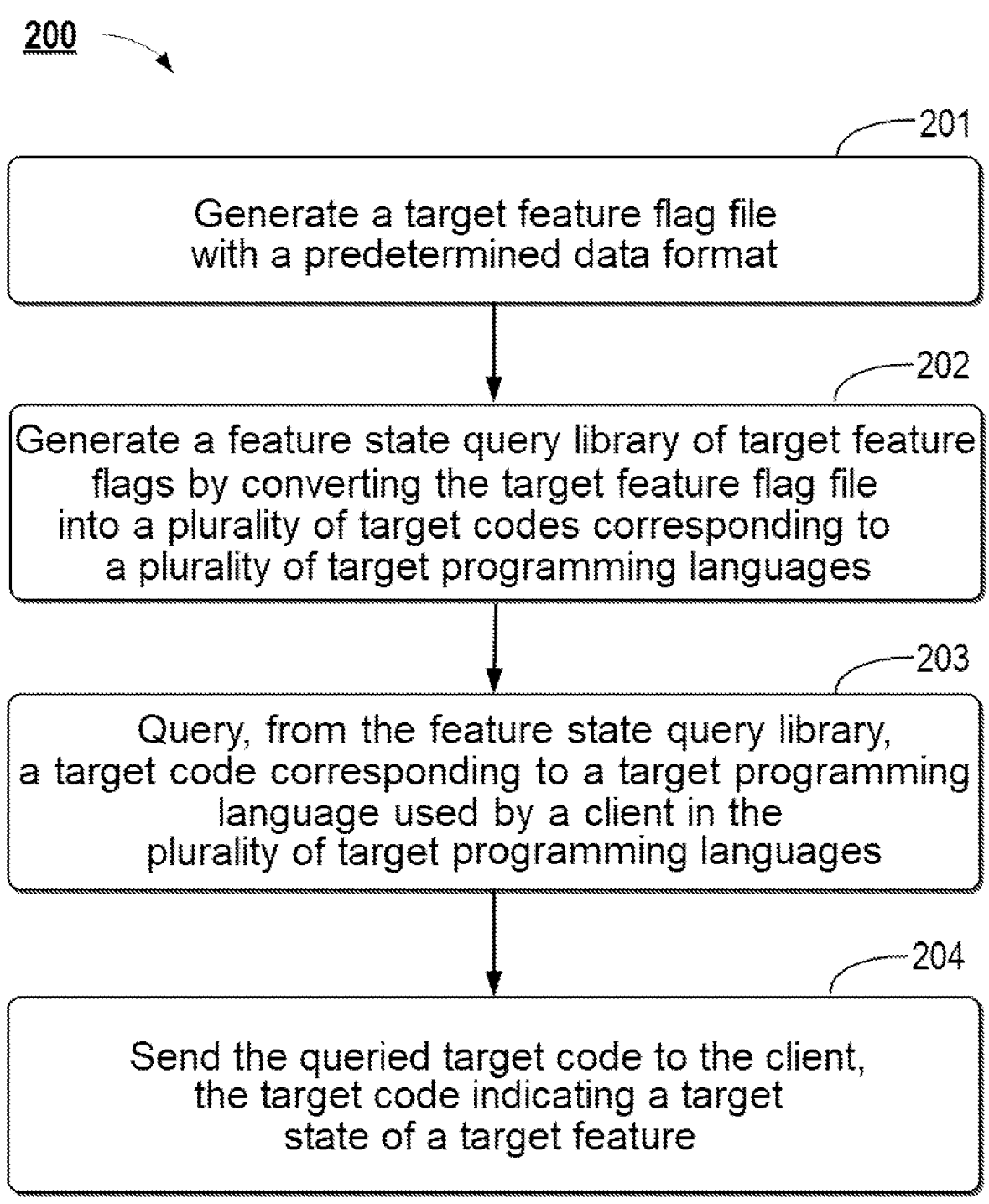

200

201

Generate a target feature flag file
with a predetermined data format

202

Generate a feature state query library of target feature
flags by converting the target feature flag file
into a plurality of target codes corresponding to
a plurality of target programming languages

203

Query, from the feature state query library,
a target code corresponding to a target programming
language used by a client in the
plurality of target programming languages

204

Send the queried target code to the client,
the target code indicating a target
state of a target feature

FIG. 2

METHOD, ELECTRONIC DEVICE, AND COMPUTER PROGRAM PRODUCT FOR SETTING FEATURE FLAGS

CROSS-REFERENCE TO RELATED APPLICATION

This application claims priority to Chinese Patent Application No. CN202310377418.3, on file at the China National Intellectual Property Administration (CNIPA), having a filing date of Apr. 10, 2023, and having "METHODS, ELECTRONIC DEVICES, AND COMPUTER PROGRAM PRODUCTS FOR SETTING FEATURE FLAGS" as a title, the contents and teachings of which are herein incorporated by reference in their entirety.

TECHNICAL FIELD

Embodiments of the present disclosure generally relate to the technical field of computers, and more specifically to a method, an electronic device, and a computer program product for setting feature flags.

BACKGROUND

A feature flag, also known as a feature toggle or feature switch, or characteristic flag, characteristic toggle, characteristic switch, or the like, is a technology used in software development to enable or disable certain features of an application or service without changing feature codes. It allows developers to turn on or off a specific feature of an application without having to deploy a new version of the software. Feature flags may be used for testing new features, gradually rolling out features, or creating different versions for different applications. Feature flags may also be used for controlling the access to certain features of a specific component.

For each application on a system, there are a plurality of feature flags corresponding to a plurality of features, and programming languages of these applications may not be the same, and their requirements and data formats may also be different. A conventional solution only supports specific programming languages and is not suitable for a system with a plurality of programming languages. Therefore, a separate solution is required for a system with a plurality of programming languages. It may be very labor-consuming, time-consuming, and resource-consuming for developers to set feature flags in different locations and programming languages for different applications based on different features.

SUMMARY OF THE INVENTION

According to example embodiments of the present disclosure, a technical solution for setting feature flags is provided, which may be used for quickly adapting feature flags to a plurality of applications with different programming languages.

In a first aspect of the present disclosure, a method is provided, the method including: generating a target feature flag file with a predetermined data format, the target feature flag file indicating a name and a target state of a target feature; generating a feature state query library of the target feature flag by converting the target feature flag file into a plurality of target codes corresponding to a plurality of target programming languages; querying, from the feature state query library, a target code corresponding to a target programming language used by a client in the plurality of target programming languages; and sending the queried target code to the client, the target code indicating the target state of the target feature. Implementation of the method provided in the first aspect is capable of improving the efficiency of configuring feature flags.

In a second aspect of the present disclosure, an electronic device is provided. The electronic device includes: a processor; and a memory coupled to the processor and having instructions stored therein, where the instructions, when executed by the electronic device, cause the electronic device to perform operations including: generating a target feature flag file with a predetermined data format, the target feature flag file indicating a name and a target state of a target feature; generating a feature state query library of the target feature flag by converting the target feature flag file into a plurality of target codes corresponding to a plurality of target programming languages; querying, from the feature state query library, a target code corresponding to a target programming language used by a client in the plurality of target programming languages; and sending the queried target code to the client, the target code indicating the target state of the target feature. Implementation of the electronic device provided in the second aspect is capable of improving the efficiency of configuring feature flags.

In a third aspect of the present disclosure, a computer program product is provided. The computer program product is tangibly stored in a computer-readable medium and includes computer-executable instructions, wherein the computer-executable instructions, when executed, cause a computer to perform the method according to the first aspect of the present disclosure.

In a fourth aspect of the present disclosure, a computer-readable storage medium having a computer program stored thereon is provided, wherein the computer program, when executed by a device, causes the device to perform the method according to the first aspect of the present disclosure.

As can be seen from the above description, solutions according to the embodiments of the present disclosure are capable of improving the efficiency of configuring feature flags. It should be understood that the Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which:

FIG. 2 shows a flow chart of a method for setting feature flags according to some embodiments of the present disclosure;

DETAILED DESCRIPTION

Figure 1:
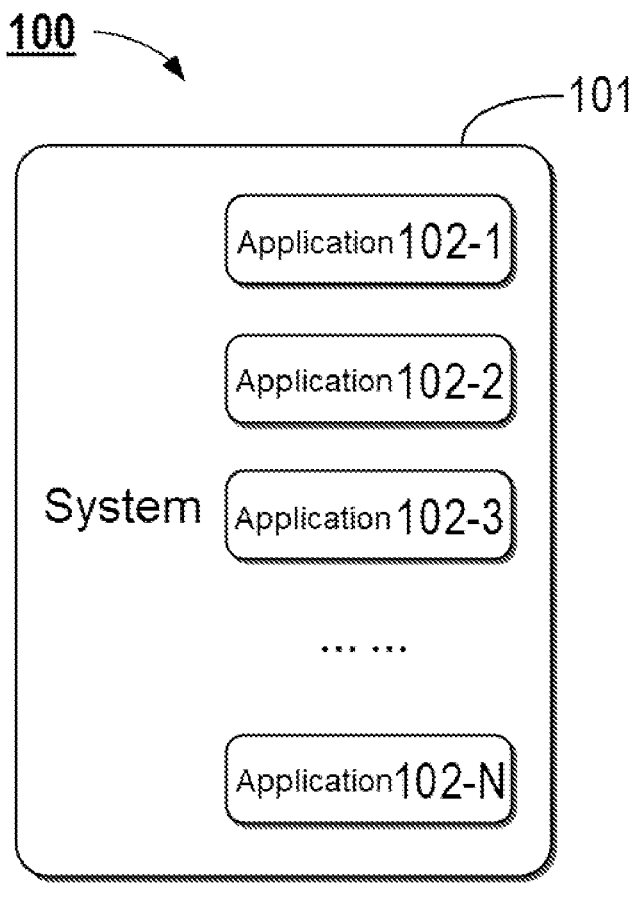
FIG. 1 shows a schematic diagram of an application scenario according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Feature flag is a technology in software development that enables or disables features without changing codes, which may be implemented through configuration files or codes. However, codes in a certain programming language cannot be read and executed by programs of other programming languages. For different applications using different programming languages on a system, it is a labor-consuming, time-consuming, and resource-consuming task for developers to set feature flags in different programming languages according to different features. For example, for a storage device that supports containerized applications, the storage device may have different containers and applications compiled in different programming languages. If feature flags need to be set in different locations and programming languages for corresponding containers and applications, it is very labor-consuming, time-consuming, and resource-consuming, so there is room for improvement.

The present disclosure provides a method, an electronic device, and a computer program product for setting feature flags. The method for setting feature flags includes: generating a target feature flag file with a predetermined data format, the target feature flag file indicating a name and a target state of a target feature; generating a feature state query library of the target feature flag by converting the target feature flag file into a plurality of target codes corresponding to a plurality of target programming languages; querying, from the feature state query library, a target code corresponding to a target programming language used by a client in the plurality of target programming languages; and sending the queried target code to the client, the target code indicating the target state of the target feature. The implementation of the method proposed in the present disclosure is capable of defining feature flags in required formats at single locations, and for different applications in different programming languages, it is capable of generating query client libraries corresponding to different programming languages to adapt to different applications. Therefore, it is capable of conveniently adding, deleting, and modifying feature flags at single locations, thereby improving the efficiency of configuring feature flags.

FIG. 1 shows a schematic diagram 100 of an application scenario according to some embodiments of the present disclosure. As shown in FIG. 1, a plurality of applications such as an application 102-1, an application 102-2, an application 102-3, . . . , and an application 102-N are deployed in a system 101. In some embodiments, the system 101 may further include components, services, modules, libraries, and the like, which is not limited in this embodiment. Applications can run independently of each other and may use different programming languages, such as java, c, c++, python, and bash. In some embodiments of the present disclosure, the system 101 may configure different application programming interfaces (APIs) for different applications for deployment and management purposes. Different applications, components, or containers may provide their own APIs, and developers may choose appropriate technologies and APIs to manage them according to their own needs. The system 101 provides a plurality of APIs, and therefore, it is easy to be accessed and operated through different programming languages. Even if different applications use different programming languages, feature flags can still be configured in the system 101.

In some embodiments, the system 101 may be a storage system used for providing efficient, flexible, and scalable data storage, having a plurality of containers deployed thereon, and supporting flexible deployment and expansion of its capacity or performance. Each of these containers is an independent virtualized runtime environment, containing applications, components, and required software and configuration information. Different operating systems and applications may be deployed on different containers. The system 101 may provide storage resources for containers, and these resources may be accessed through applications running within the containers. In a multi-container storage system, each container has its own storage space and may be independently managed and controlled. The method can better provide flexibility and scalability, while also enhancing security and isolation, and preventing interference and impact between the containers.

In some embodiments of the present disclosure, when storage resources need to be provided to containers, appropriate feature flags may be set to be enabled or disabled in the storage system to ensure that the containers can access the required storage features. The developers may flexibly enable or disable some storage features for different containers or applications by configuring feature flags in the storage system as needed. For example, an automatic thin provisioning feature may be enabled or disabled by setting a "thin_provision" flag, a snapshot and clone feature may be enabled or disabled by setting a "snapshot_clone" flag, a backup and restore feature may be enabled or disabled by setting a "backup_restore" flag, and a data compression and deduplication feature may be enabled or disabled by setting a "compression_dedupe" flag.

In some application scenarios, feature flags are usually used for controlling release of new and unfinished features. The release of flags is defined in a single feature flag definition file of the entire system or product. Feature developers use feature flags as code toggles to control behaviors of features in different applications. Each feature flag has a default state: enabled or disabled. During feature development, the feature flag remains disabled. After the feature is ready, the feature flag may be changed to enabled. In a development process, for testing purposes, a product may allow developers or testers to override the default state during installation or runtime. It allows the developers to gradually introduce new features in an online environment, without having to wait for all features to be completed before releasing them. In this way, the developers can gradually test and optimize new features, and ultimately release them to all applications.

In some embodiments of the present disclosure, a feature flag framework is provided as general software that may provide features of enabling or disabling features for a plurality of applications in the system without changing feature codes. By utilizing the framework, the system can define its feature flags in desired formats in single locations throughout the entire system, and control the enabling or disabling of features on different components based on the feature flags and supported APIs. Moreover, if feature state override is required, a feature state override file in a required format is generated at an appropriate time. A target feature state file is generated at an appropriate time by calling a feature state generation script provided by the feature flag framework. In some embodiments, a feature state query library provided by the framework can be used by different applications of the system to query feature states and perform feature control. The framework in the embodiments of the present disclosure is an extensible feature flag framework, which may be conveniently enhanced to support other new types of feature flags when needed. The framework further supports verification of a feature flag file, code generation, and a feature state query library for a plurality of programming languages. For specific illustration, reference can be made to subsequent embodiments.

FIG. 2 shows a flow chart of a method 200 for setting feature flags according to some embodiments of the present disclosure. The method 200 may be performed by an electronic device. The electronic device may include, but is not limited to, personal computers (PCs), server computers, handheld or laptop devices, mobile terminals, multiprocessor systems, or combinations thereof. The embodiments of the present disclosure do not make any limitation to the device type and the like of the electronic device that implements the method 200. It should be understood that, in the embodiments of the present disclosure, the subject implementing the method 200 may be implemented by an entity device or may be implemented by a plurality of entity devices together. It is understandable that the subject implementing the method 200 may be a logical function module in an entity device, or may be a logical function module composed of a plurality of entity devices. It should be understood that, in the following embodiments of the present disclosure, the steps in the method provided in the embodiments of the present disclosure may be performed by one entity device, or the steps in the method provided in the embodiments of the present disclosure may be performed by a plurality of entity devices cooperatively, which is not limited in the embodiments of the present disclosure. In some embodiments, an electronic device may include a plurality of applications using different programming languages. It should be understood that the method 200 may also include additional blocks that are not shown and/or may omit blocks that are shown, and the scope of the present disclosure is not limited in this regard.

At a block 201, a target feature flag file with a predetermined data format is generated, the target feature flag file indicating a name and a target state of a target feature. At a block 202, a feature state query library of the target feature flag is generated by converting the target feature flag file into a plurality of target codes corresponding to a plurality of target programming languages. At a block 203, a target code corresponding to a target programming language used by a client in the plurality of target programming languages is queried from the feature state query library. At a block 204, the queried target code is sent to the client, wherein the target code indicates the target state of the target feature. Implementing the method 200 can improve the efficiency of configuring feature flags for a plurality of clients using different programming languages. The method embodiment described in FIG. 2 may be understood in conjunction with the subsequent embodiments in FIG. 3 to FIG. 6.

In combination with the aforementioned embodiments, in some embodiments of the present disclosure, a feature flag default file with a predetermined data format is generated, and the feature flag default file indicates a default state of the target feature under an initial setting. A feature flag override file with a predetermined data format is generated, and the feature flag override file indicates a default state of the target feature under an override situation. The target feature flag file is then generated based on the feature flag default file and feature flag override file.

In some embodiments of the present disclosure, when a feature flag override file is detected, the default state in the feature flag override file is used to override the default state of the feature flag default file as the target state in the target feature flag file. Specifically, reference may be made in conjunction with the embodiment described with reference to FIG. 5.

In combination with other embodiments, in some other embodiments of the present disclosure, the set states of feature flags include: enabled, disabled, and the like. The predetermined data format may be a JSON format. The default state of the target feature under the initial setting is disabled, and the default state of the target feature under the override situation is enabled. The feature flag default file further includes dependency relationships, and the dependency relationships indicate dependencies with feature states of other feature flags.

In some other embodiments of the present disclosure, in response to receiving a query request from a client using a target programming language, the target codes corresponding to the plurality of target programming languages may be queried from the feature state query library, and the query request carries the name of the target feature.

In some other embodiments of the present disclosure, a feature state query library may be constructed based on a plurality of programming languages and the target feature flag file. The feature state query library includes codes respectively corresponding to the plurality of target programming languages and indicating the target state of the target feature. The feature state query library then acquires a runtime path of the target feature flag file from the target feature flag file. In some other embodiments of the present disclosure, the feature state query library provides a plurality of application programming interfaces corresponding to a plurality of clients; and configures, by using the plurality of application programming interfaces, query paths of the plurality of clients for the target state of the target feature flag. Specifically, reference may be made in conjunction with the embodiment described with reference to FIG. 4.

In one example, a second target feature flag file with a predetermined data format may be generated, and the second target feature flag file indicates a second name and a second target state of a second target feature. Then, a feature state query library of the second target feature flag is generated by converting the second target feature flag file into a plurality of target codes corresponding to a plurality of target programming languages. In another example, the target feature flag file may be converted into a second target code corresponding to a second target programming language used by a second client in the plurality of target programming languages according to the second target programming language. According to a query request of the second client, the second target code corresponding to the second target programming language is queried from the feature state query library. The queried second target code is sent to the second client, and the second target code indicates the target state of the target feature.

Figure 3:
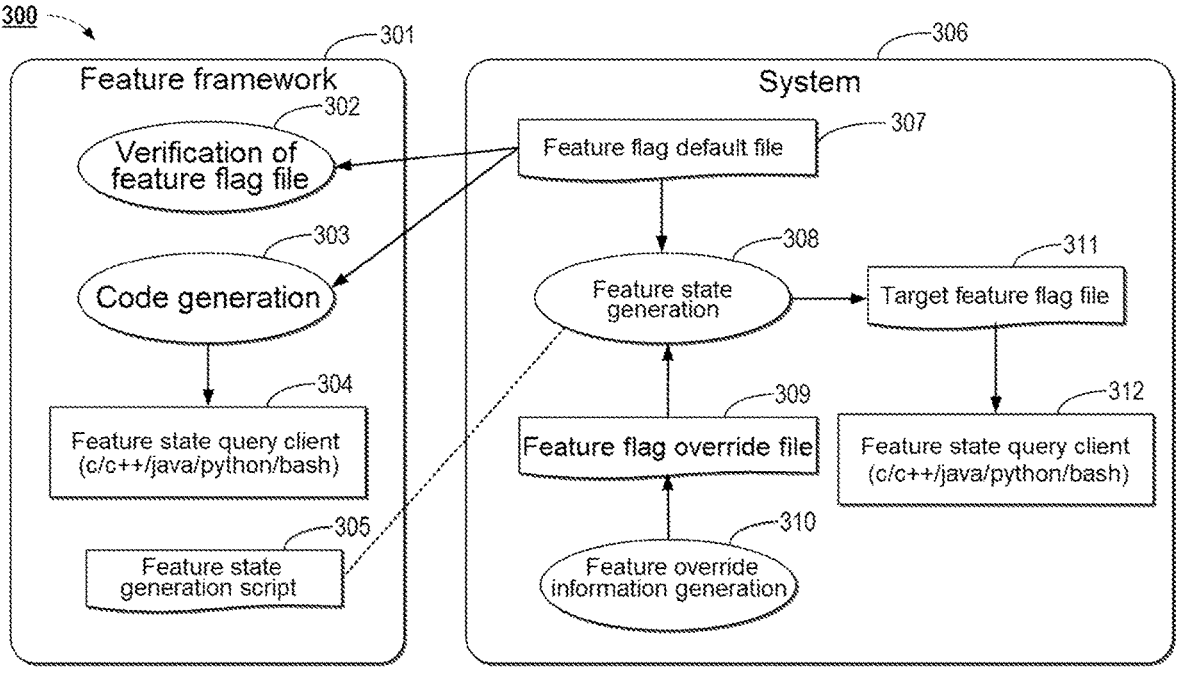
FIG. 3 shows a schematic diagram of an architecture for setting feature flags according to some embodiments of the present disclosure.

FIG. 3 shows an architecture 300 for setting feature flags according to some embodiments of the present disclosure. The architecture 300 is designed from the perspective of general software, and provides product independent functions and defines common APIs that the product must follow, so as to provide the features of feature flags for different components in different programming languages. By utilizing the framework, the system may define its feature flags in the desired formats in single locations throughout the entire system, and control the enabling or disabling of features on different applications based on the feature flags and supported APIs.

As shown in FIG. 3, the feature framework 301 supports verification of a feature flag file 302, code generation 303, a feature state query client 304 in a plurality of programming languages, and a feature state generation script 305. The system 306 includes a feature flag default file 307, feature state generation 308, a feature flag override file 309, feature override information generation 310, a target feature flag file 311, a feature state query client 312, and the like. A dedicated code library feature framework 301 for setting feature flags in the embodiments of the present disclosure is product agnostic and has scalability to be able to support other types of feature flags that may appear in the future.

A feature flag definition file in a json format may be used for setting a feature state. Generally, there is a default configuration file 307, such as feature_flags_default.json. If feature state override is required, a feature flag override file 309 such as feature_override.json in a required format is generated 310 at an appropriate time. By calling the feature state generation script 305 such as "feature_state_generation.py" provided by the feature framework 301, the target feature flag file 311 such as "feature_flags.json" is generated at an appropriate time, and all feature flags for the system may be defined in this single file. The feature flag file must define "features" in a feature list, and each feature includes the following attributes: name, default state, dependency relationship, and the like. The name, that is, name, is used for identifying a unique name. The default state is default-_state and may be enabled, disabled, or null, and valid values may be, for example, enabled or disabled, 1 or 0, true or false, and the like. The dependency relationship, that is, depends_on, is a list of dependency flags, and circular dependency relationships or default states of dependency options that are inconsistent with the current option are not allowed. For enabled flags, all dependent flags must be in the enabled state.

Based on a feature flag configuration file and source codes, the feature state query client 304 may be constructed. During the construction, the feature flag file verification 302 and the code generation 303 may be performed based on the feature flag definition file. For details, reference may be made to the schematic diagram 400 of constructing a query client shown in FIG. 4.

Figure 4:
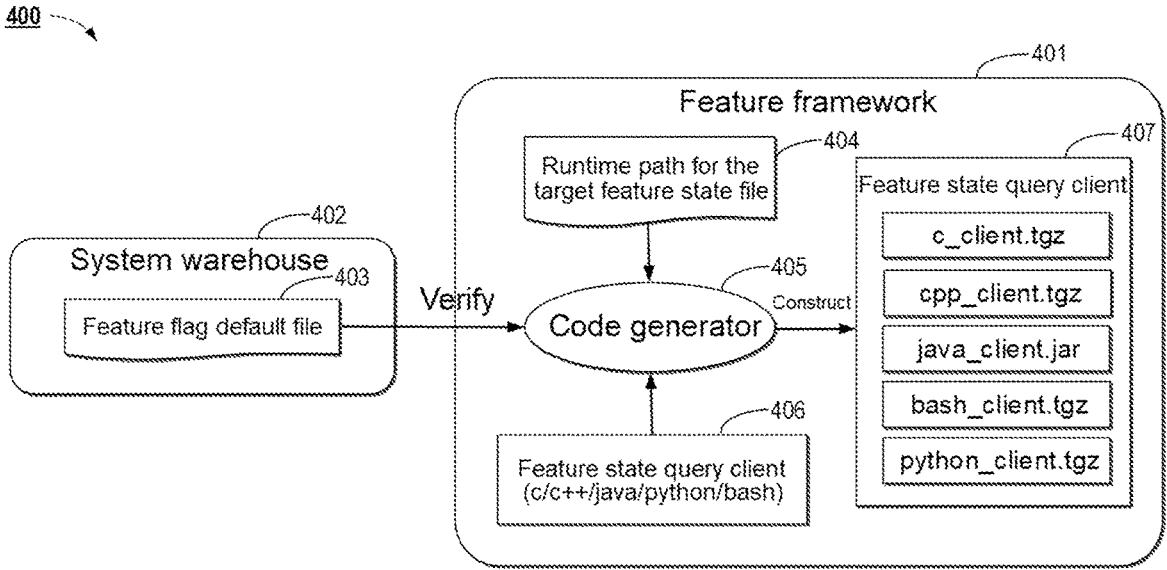
FIG. 4 shows a schematic diagram of constructing a query client according to some embodiments of the present disclosure.

As shown in FIG. 4, based on using a feature flag default file 403 (such as feature_flags_default.json) of a system warehouse 402, a runtime file path 404 for the target feature state file (also known as an active feature state file) provided in the feature framework 401, and the source codes provided by the feature state query client 406 as inputs, a code generator 405 constructs a feature state query client 407. A code generation script provided by the code generator 405 may verify the feature flag file 403. The code generation script may further generate the runtime file path 404 of the target feature state file into the code of the feature state query client 407, and finally construct the feature state query client 407 in a plurality of programming languages. In some embodiments, the feature state query client 407 reports the feature state by reading the target feature state file. In some embodiments, the feature state query client 407 provided by the framework may be used by different applications of the system to query the feature state and perform feature control.

The constructed feature state query client 407 may include a plurality of feature state query clients in a plurality of languages (for example, Java/c/c++/Python/bash/and the like). Each query client may provide an API similar to "bool isFeatureEnabled (<flag>)" to report its feature state once the feature state file is loaded into storage. The feature flag may be used as a toggle to control on or off of a feature. For example, by using a function featureStateQueryClient.isFeatureEnabled ("FEATURE_A"), and by using an if-else conditional statement, it is checked whether the feature FEATURE_A is enabled in the application, and if the feature is enabled, codes in an if statement block are executed. Otherwise, codes in an else statement block are executed.

The feature state client is a client library used for querying and managing feature states, and can generate corresponding APIs for different programming languages. For example, it is used for dynamically querying and modifying feature states, thereby achieving dynamic configuration and control of features. In some embodiments, the current feature state may be acquired by querying the feature state client when the application starts or runs. For example, an application queries the state of a specified feature by a method of calling featureStateQueryClient.isFeatureEnabled (featureName). If the feature is already enabled, a return value of the function may be enabled; otherwise, it is disabled. When a featureStateQueryClient library is deployed, it is necessary to ensure that it can access a feature state storage location (such as a database or cache system) so as to correctly query and modify the feature state. The featureStateQueryClient client library may provide API interfaces for accessing and modifying feature states.

In some embodiments, the process of constructing a query client library may include: finding, according to a selected programming language, a source code client library suitable for the language, and downloading or installing the library. According to a selected code generator, API codes for the client library are generated by the selected code generator. Some code generators may also generate codes for executing feature files on applications. A feature file path is specified so that the client library knows which feature file to query. A client library is generated and constructed for applications to use it to query feature states. The finally constructed query client library generally includes APIs for querying feature states. For example, for the Python language, the query client library may provide a group of Python APIs to process and execute requests for querying feature states. For the C language, the query client library may provide a group of C functions to perform the same operation. According to different source code client libraries and code generators, the finally generated client library may contain different types of APIs, such as functions, classes, and structures, for meeting specific programming languages and usage scenario requirements.

The code generator may automatically generate, based on needs and requirements of a specific programming language, a client query library used by the specific programming language. Generally, the code generator may generate, according to a feature flag definition in a JSON file, a client query library code corresponding to the file. Specifically, the code generator needs to first parse a configuration file, for example, read feature flag information from a JSON configuration file, and convert it into a data structure within the program. Then, the code generator will automatically generate client query library codes for the corresponding programming language according to content of the data structure. In some embodiments, when the JSON file is parsed, the code generator may generally verify the format and structure of the file and ensure that the file contains necessary fields and data types. If the file format is incorrect, exceptions or errors may be caused. Then, a query is constructed, and the API provided by the query library is used for constructing a query statement suitable for a specific client. Different query statements may be generated according to values of feature flags. Afterwards, a template engine or the code generator is used for generating codes, and the query statement provided by the query library is embedded into the codes. The generated codes should comply with the client specific language and code specifications. Afterwards, a generated code file is saved to an appropriate location. The codes may be packaged and then published to the client as needed. It should be noted that different programming languages and query libraries may have different features and limitations, and therefore, appropriate processing needs to be performed for different languages and libraries. This may require fine-tuning the code generation process or adding more conditional statements to ensure that the generated codes can run correctly and meet the needs of specific clients.

When generating codes, the code generator needs to consider the following factors: syntax and specifications of programming languages: different programming languages have different syntax and specifications, and the code generator needs to generate codes according to the syntax and specifications of the target programming language. An implementation of feature flag enabling conditions and rules: implementations of feature flag enabling conditions and rules may vary depending on the programming languages. For example, in Python, a dictionary (dict) may be used for storing states of feature flags; while in Java, it may be implemented by using Maps or Interfaces. Design of a client API: A client API is usually designed according to characteristics and syntax of the programming language. The code generator needs to design a client API that is easy to use and understand according to the requirements of the programming language. Once the code generator generates the client query library codes, developers may map them to the application and use the library to handle feature flag states.

In some embodiments, in a feature flag based architecture, a JSON file may be used to define all feature flags. This JSON file may be stored in a cloud or stored locally, and may be shared by a plurality of client applications. For application clients in different programming languages, it is necessary to parse and process feature flags in order to dynamically enable or disable features in the applications. By providing a feature flag client library for a plurality of programming languages, feature flag features may be quickly and conveniently implemented. The code library generated in the query client library is a code library that helps application developers easily use feature flags, including the feature for parsing a feature flag JSON file. The feature flag client library may be compiled in various programming languages and may provide feature flag parsers for the programming languages. These parsers can read and parse JSON files, store feature flags and their corresponding states in a memory, so that applications can easily query and use these feature flags. In addition to parsing JSON files, the feature flag client library may also provide other features, such as supporting a plurality of feature flag enabling conditions and rules, providing client APIs, and the like.

Information obtained by different APIs may be different, depending on features and accessible data provided by developers when implementing the API interfaces. For example, a basic API interface may only provide state information (enabled or disabled) of feature flags, while other more complex APIs may provide more information, such as names, descriptions, and target audiences of the feature flags. In addition, there are also some APIs that allow application clients to dynamically create, modify, and delete feature flags, thereby enabling the application clients to achieve more flexible and adaptive features. One feature flag may also correspond to a plurality of APIs, such as different operations for querying, creating, modifying, or deleting the feature. According to requirements, developers may define a corresponding URL path, an HTTP method, and parameters for each API, and implement corresponding logic to handle client requests.

When feature flags are used, there is usually a default JSON configuration file that contains default values for all feature flags. Additionally, an optional override JSON configuration file may also be provided for overriding default values of some feature flags to different values. The default value and the override value need to be merged to determine a final target value for each feature flag.

Figure 5:
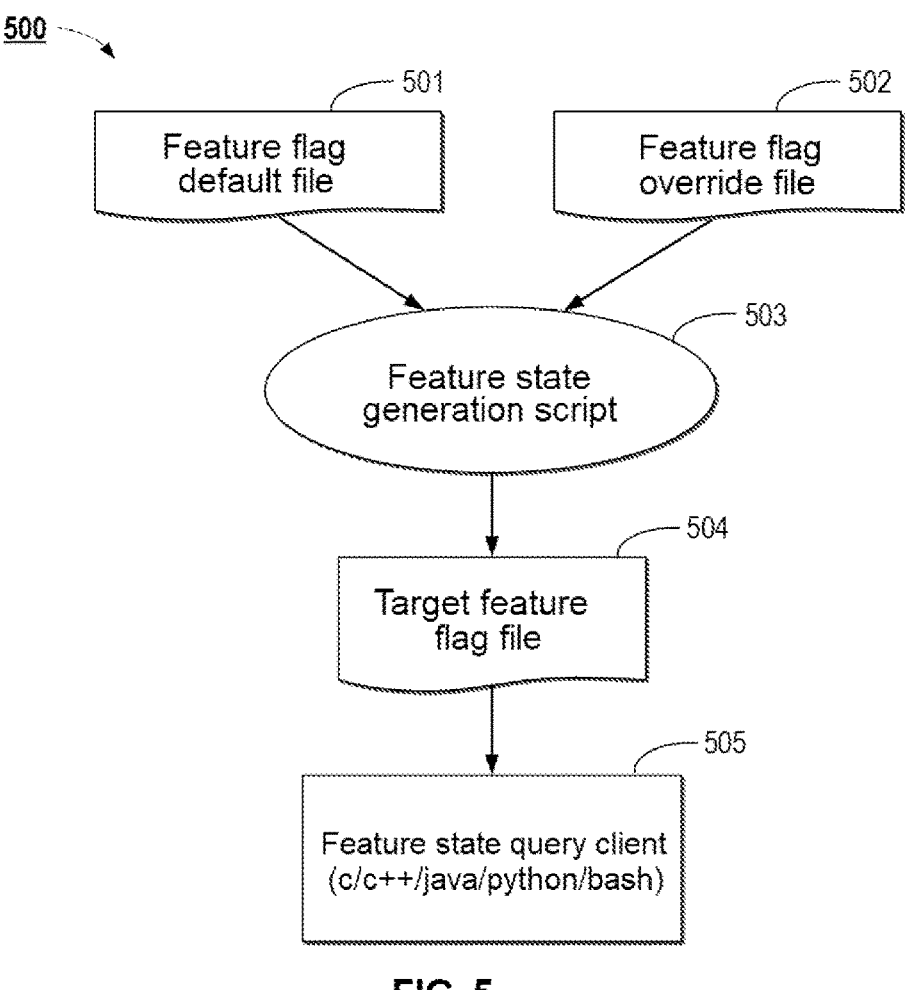
FIG. 5 shows a schematic diagram of merging feature state files according to some embodiments of the present disclosure.

Referring to FIG. 5, a schematic diagram 500 of merging feature state files is shown. A feature state generation script 503 (such as feature_state_generation.py) merges a feature flag default file 501 (such as feature_flags_default.json) and a possible feature flag override file 502 (such as feature_o- verride.json) to generate a target feature flag file (or referred to as an active feature flag file, such as feature_flags.json), and the feature flag file is a single source for all feature state query clients. For example, a default state in a feature flag default file of Feature_A is disabled, a default state in the target feature flag file is disabled, and a default state in the generated feature flag override file is enabled. The feature flag default file and the feature flag override file are merged, the feature state in the feature flag override file overrides the feature state of the feature flag default file, and a current feature state in the generated target feature flag file is enabled.

In some embodiments, the method of merging a default JSON file and an override JSON file may be achieved through the following steps: the default JSON file is parsed into a dictionary or map, and stored in a memory. If there is an override JSON file, it is parsed into a dictionary or map, and merged with the dictionary of the default JSON file. If a flag is defined in the override JSON file, a default value is replaced with a value in the override JSON file. Otherwise, the default value is kept. The merged dictionary or map is used as a state of a client library, and used to determine a final value of each flag when querying a flag state.

According to the various embodiments and their combination embodiments of the present disclosure described above, the efficiency of configuring feature states can be improved. It should be understood that the implementations shown in FIG. 3 to FIG. 5 above are only schematic. According to practical applications, the architecture or processes shown in FIG. 3 to FIG. 5 may have other different forms and may further include more or fewer one or more functional modules and/or units, and the modules and/or units may be partially or completely implemented as hardware modules, software modules, firmware modules, or any combination thereof, which is not limited in the embodiments of the present disclosure.

It can be understood that the specific names and/or protocols of the various components of the system described herein are intended only to help those skilled in the art better understand the ideas of the present disclosure and are not intended to limit the scope of the present disclosure in any way. Moreover, in other embodiments, more or better components may be included, as well as alternative components with the same or similar features.

Figure 6:
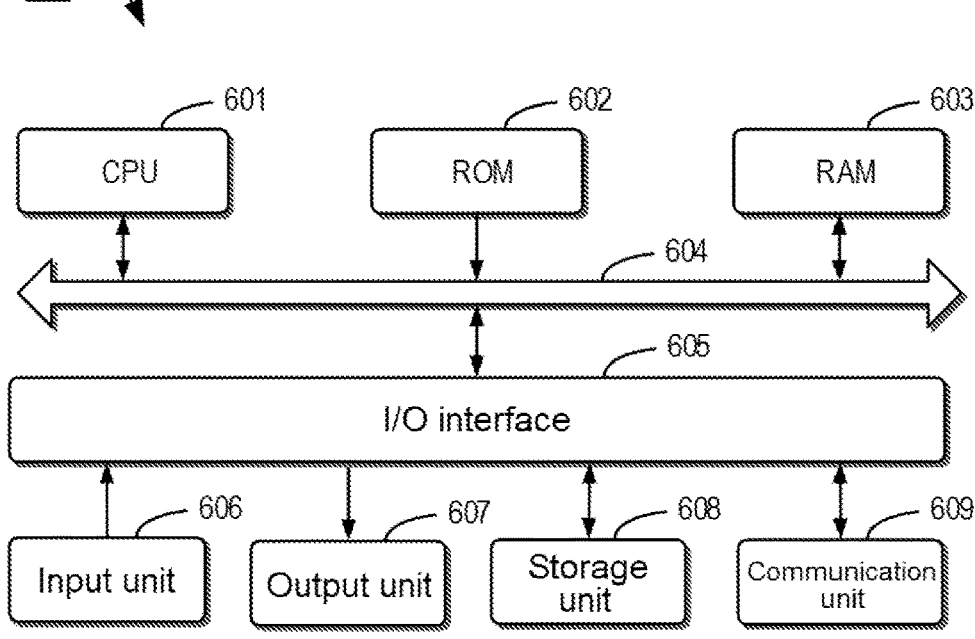
FIG. 6 shows a schematic structural diagram of a device that can be used for implementing embodiments of the present disclosure.

FIG. 6 shows a schematic structural diagram of an example device 600 that can be used to implement some embodiments of the present disclosure. The device 600 may be implemented as a server or a PC. The embodiments of the present disclosure do not limit the specific implementation type of the device 600. As shown in FIG. 6, the device 600 includes a central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; the storage unit 608, such as a magnetic disk and an optical disc; and a communication unit 609, such as a network card, a modem, and a wireless communication transceiver. The communication unit 609 allows the device 600 to exchange information/data with other devices via a computer network such as the Internet and/or various telecommunication networks.

The processing unit 601 may execute the various methods and/or processing described above, such as the method 200. For example, in some embodiments, the method 200 may be implemented as a computer software program that is tangibly included in a machine-readable medium, such as the storage unit 608. In some embodiments, part of or all the computer program may be loaded and/or installed onto the device 600 via the ROM 602 and/or the communication unit 609. When the computer program is loaded onto the RAM 603 and executed by the CPU 601, one or more steps of the method 200 described above may be performed. Alternatively, in some other embodiments, the CPU 601 may be configured to perform the method 200 in any other suitable manners (e.g., by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, micro-code, firmware instructions, state setting data, or source codes or target codes written in one or any combination of more programming languages, including object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or a plurality of executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The embodiments of the present disclosure have been described above. The foregoing description is illustrative rather than exhaustive, and is not limited to the embodiments disclosed. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for setting feature flags, the method comprising:

generating a target feature flag file with a predetermined data format, the target feature flag file indicating a name and a target state of a target feature;

generating a feature state query library of the target feature flag by converting the target feature flag file into a plurality of target codes corresponding to a plurality of target programming languages, at least in part by constructing the feature state query library based on the plurality of programming languages and the target feature flag file, the feature state query library comprising a plurality of feature state query clients in respective ones of the plurality of target programming languages, wherein each feature state query client includes an API (Application Programming Interface) that reports the target state of the target feature;

querying, from the feature state query library, a target code corresponding to a target programming language used by a client in the plurality of target programming languages; and sending the queried target code to the client, the target code indicating the target state of the target feature.

2. The method according to claim 1, further comprising:

generating a feature flag default file with the predetermined data format, the feature flag default file indicating a default state of the target feature under an initial setting;

generating a feature flag override file with the predetermined data format, the feature flag override file indicating a default state of the target feature under an override situation; and generating the target feature flag file based on the feature flag default file and the feature flag override file.

3. The method according to claim 2, wherein the default state of the target feature under the initial setting is disabled, and the default state of the target feature under the override situation is enabled.

4. The method according to claim 2, wherein generating the target feature flag file based on the feature flag default file and the feature flag override file comprises:

using, when the feature flag override file is detected, the default state in the feature flag override file to override the default state of the feature flag default file as the target state in the target feature flag file.

5. The method according to claim 2, wherein the feature flag default file further comprises dependency relationships, the dependency relationships indicating dependencies with feature states of other feature flags.

6. The method according to claim 1, further comprising:

querying, from the feature state query library, the target codes corresponding to the plurality of target programming languages in response to receiving a query request from the client using the target programming language, the query request carrying the name of the target feature.

7. The method according to claim 1, further comprising:

acquiring, by the feature state query library, a runtime path of the target feature flag file from the target feature flag file.

8. The method according to claim 7, further comprising:

configuring, by using the plurality of application programming interfaces, query paths of the plurality of clients for the target state of the target feature flag.

9. The method according to claim 1, further comprising:

generating a second target feature flag file with a predetermined data format, the second target feature flag file indicating a second name and a second target state of a second target feature; and generating a feature state query library of the second target feature flag by converting the second target feature flag file into a plurality of target codes corresponding to a plurality of target programming languages.

10. The method according to claim 1, further comprising:

converting, according to a second target programming language among the plurality of target programming languages, the target feature flag file into a second target code corresponding to the second target programming language;

querying, from the feature state query library according to a query request of a second client, the second target code corresponding to the second target programming language used by the second client; and sending the queried second target code to the second client, the second target code indicating the target state of the target feature.

11. An electronic device, comprising:

a processor; and a memory coupled to the processor and having instructions stored therein, wherein the instructions, when executed by the processor, cause the electronic device to perform operations comprising:

generating a target feature flag file with a predetermined data format, the target feature flag file indicating a name and a target state of a target feature;

generating a feature state query library of the target feature flag by converting the target feature flag file into a plurality of target codes corresponding to a plurality of target programming languages, at least in part by constructing the feature state query library based on the plurality of programming languages and the target feature flag file, the feature state query library comprising a plurality of feature state query clients in respective ones of the plurality of target programming languages, wherein each feature state query client includes an API (Application Programming Interface) that reports the target state of the target feature;

querying, from the feature state query library, a target code corresponding to a target programming language used by a client in the plurality of target programming languages; and sending the queried target code to the client, the target code indicating the target state of the target feature.

12. The electronic device according to claim 11, wherein the operations further comprise:

generating a feature flag default file with the predetermined data format, the feature flag default file indicating a default state of the target feature under an initial setting;

generating a feature flag override file with the predetermined data format, the feature flag override file indicating a default state of the target feature under an override situation; and generating the target feature flag file based on the feature flag default file and the feature flag override file.

13. The electronic device according to claim 12, wherein the default state of the target feature under the initial setting is disabled, and the default state of the target feature under the override situation is enabled.

14. The electronic device according to claim 12, wherein the operation of generating the target feature flag based on the feature flag default file and the feature flag override file comprises:

using, when the feature flag override file is detected, the default state in the feature flag override file to override the default state of the feature flag default file as the target state in the target feature flag file.

15. The electronic device according to claim 11, wherein the operations further comprise:

querying, from the feature state query library, the target codes corresponding to the plurality of target programming languages in response to receiving a query request from the client using the target programming language, the query request carrying the name of the target feature.

16. The electronic device according to claim 11, wherein the operations further comprise:

acquiring, by the feature state query library, a runtime path of the target feature flag file from the target feature flag file.

17. The electronic device according to claim 11, wherein the operations further comprise:

configuring, by using the plurality of application programming interfaces, query paths of the plurality of clients for the target state of the target feature flag.

18. The electronic device according to claim 11, wherein the operations further comprise:

generating a second target feature flag file with a predetermined data format, the second target feature flag file indicating a second name and a second target state of a second target feature; and generating a feature state query library of the second target feature flag by converting the second target feature flag file into a plurality of target codes corresponding to a plurality of target programming languages.

19. The electronic device according to claim 11, wherein the operations further comprise:

converting, according to a second target programming language among the plurality of target programming languages, the target feature flag file into a second target code corresponding to the second target programming language;

querying, from the feature state query library according to a query request of a second client, the second target code corresponding to the second target programming language used by the second client; and sending the queried second target code to the second client, the second target code indicating the target state of the target feature.

20. A computer program product having a non-transitory computer readable medium which stores a set of instructions to set feature flags; the set of instructions, when carried out by computerized circuitry, causing the computerized circuitry to perform a method of:

generating a target feature flag file with a predetermined data format, the target feature flag file indicating a name and a target state of a target feature;

generating a feature state query library of the target feature flag by converting the target feature flag file into a plurality of target codes corresponding to a plurality of target programming languages, at least in part by constructing the feature state query library based on the plurality of programming languages and the target feature flag file, the feature state query library comprising a plurality of feature state query clients in respective ones of the plurality of target programming languages, wherein each feature state query client includes an API (Application Programming Interface) that reports the target state of the target feature;

querying, from the feature state query library, a target code corresponding to a target programming language used by a client in the plurality of target programming languages; and sending the queried target code to the client, the target code indicating the target state of the target feature.

* * * * *